United States Patent
Nelson et al.

(10) Patent No.: US 9,858,360 B2
(45) Date of Patent: Jan. 2, 2018

(54) SYSTEM AND METHOD FOR CONTROLLING MANUFACTURING OF AN ITEM

(71) Applicants: Lee-Bath Nelson, Raanana (IL); Moshe Molcho, Raanana (IL)

(72) Inventors: Lee-Bath Nelson, Raanana (IL); Moshe Molcho, Raanana (IL)

(73) Assignee: MAKE IT LEO LTD, Tel Aviv (IL)

( * ) Notice: Subject to any disclaimer, the term of this patent is extended or adjusted under 35 U.S.C. 154(b) by 379 days.

(21) Appl. No.: 14/201,959

(22) Filed: Mar. 10, 2014

(65) Prior Publication Data

US 2015/0253761 A1 Sep. 10, 2015

(51) Int. Cl.
| | |
|---|---|
| G06F 21/62 | (2013.01) |
| G06F 17/50 | (2006.01) |
| G06F 3/12 | (2006.01) |
| G06F 21/60 | (2013.01) |
| G05B 19/4099 | (2006.01) |
| B33Y 50/00 | (2015.01) |

(52) U.S. Cl.
CPC ............ *G06F 17/50* (2013.01); *G06F 3/1222* (2013.01); *G06F 3/1238* (2013.01); *G06F 3/1239* (2013.01); *G06F 3/1288* (2013.01); *G06F 21/608* (2013.01); *B33Y 50/00* (2014.12); *G05B 19/4099* (2013.01); *G05B 2219/31001* (2013.01); *G06F 2221/2107* (2013.01)

(58) Field of Classification Search
CPC .... G06F 3/1222; G06F 3/1238; G06F 3/1239; G06F 17/50; G06F 21/608; G06F 2221/2107; G05B 19/4099; G05B 2219/31001; B33Y 50/00

USPC ............................................................ 726/9
See application file for complete search history.

(56) References Cited

U.S. PATENT DOCUMENTS

2003/0172366 A1* 9/2003 Rhee ...................... G06F 17/50
717/100
2007/0229873 A1 10/2007 Kato
(Continued)

FOREIGN PATENT DOCUMENTS

JP 2001 100960 4/2001

OTHER PUBLICATIONS

International Search Report for International App. No. PCT/IL2015/050241 dated Jul. 9, 2015.

*Primary Examiner* — Hadi Armouche
*Assistant Examiner* — Sakinah Taylor
(74) *Attorney, Agent, or Firm* — Pearl Cohen Zedek Latzer Baratz LLP

(57) ABSTRACT

A system and method for controlling manufacturing of one or more items may include providing a first 3D design representation, the first 3D design representation usable by a manufacturing device for manufacturing the item; encrypting the first 3D design representation to produce an encrypted 3D design representation; associating a set of tokens with the encrypted 3D design representation and providing the encrypted 3D design representation. A method or system may include obtaining a token and including the token in a request to manufacture the item; using the token to determine whether or not to provide a decryption key; and, if determining to provide the decryption key, using the decryption key to produce a second 3D design representation, the second 3D design representation usable by a manufacturing device for manufacturing the item.

15 Claims, 7 Drawing Sheets

(56) References Cited

U.S. PATENT DOCUMENTS

| | | | | |
|---|---|---|---|---|
| 2012/0015630 A1* | 1/2012 | Ryali | ............ | H04W 4/20 |
| | | | | 455/411 |
| 2012/0105903 A1* | 5/2012 | Pettis | ............ | G06F 3/12 |
| | | | | 358/1.14 |
| 2013/0018793 A1* | 1/2013 | Wong | ............ | G06Q 20/4097 |
| | | | | 705/44 |
| 2013/0235412 A1* | 9/2013 | Baldwin | ............ | G06F 3/1238 |
| | | | | 358/1.14 |
| 2014/0115345 A1* | 4/2014 | Maetz | ............ | G09C 5/00 |
| | | | | 713/189 |
| 2014/0156053 A1* | 6/2014 | Mahdavi | ............ | B29C 67/0059 |
| | | | | 700/119 |
| 2014/0223583 A1* | 8/2014 | Wegner | ............ | G06F 17/50 |
| | | | | 726/33 |
| 2015/0221053 A1* | 8/2015 | Tapley | ............ | G06Q 50/184 |
| | | | | 705/310 |
| 2015/0350278 A1* | 12/2015 | Isbjornssund | ............ | H04L 9/00 |
| | | | | 700/98 |
| 2016/0140119 A1* | 5/2016 | Ishii | ............ | G06F 17/30 |
| | | | | 707/738 |

* cited by examiner

SYSTEM AND METHOD FOR CONTROLLING MANUFACTURING OF AN ITEM

FIELD OF THE INVENTION

The present invention is in the field production of items. In particular, the present invention is directed to production of items according to a design representation.

BACKGROUND

Manufacturing items using a digital representation of the items is known in the art. For example, three dimensional (3D) printers and Computer Numerical Control (CNC) machines manufacture items based on a digital representation of the items, e.g., provided as a file.

In particular, 3D printing is a fast growing field which has caused the manufacturing of items to become significantly more distributed. When manufacturing is centralized, e.g., done in a factory, controlling quantities and other aspects, e.g., where, how, and how many items are produced, may be relatively easy.

However, in today's distributed environment and with 3D printers becoming available, every owner of a 3D printer or other manufacturing machines can manufacture items on the premises or even at home.

Known systems and methods do not enable the growing number of designers to sell or provide their designs to the growing number of clients or manufacturing entities.

SUMMARY

A system and method for controlling manufacturing of one or more items may include providing, for example, by a designer computer, a first 3D design representation, the first 3D design representation usable by a manufacturing device for manufacturing the one or more products or items; encrypting the first 3D design representation to produce an encrypted 3D design representation; associating a set of tokens with the encrypted 3D design representation and providing the encrypted 3D design representation either to a manufacturing device or to a manufacturer computer. A method may include obtaining a token and including the token in a request to manufacture the items; using the token to determine whether or not to provide a decryption key; and, if determining to provide the decryption key, providing the decryption key and using the decryption key to produce a second 3D design representation, the second 3D design representation usable by a manufacturing device for manufacturing the items.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
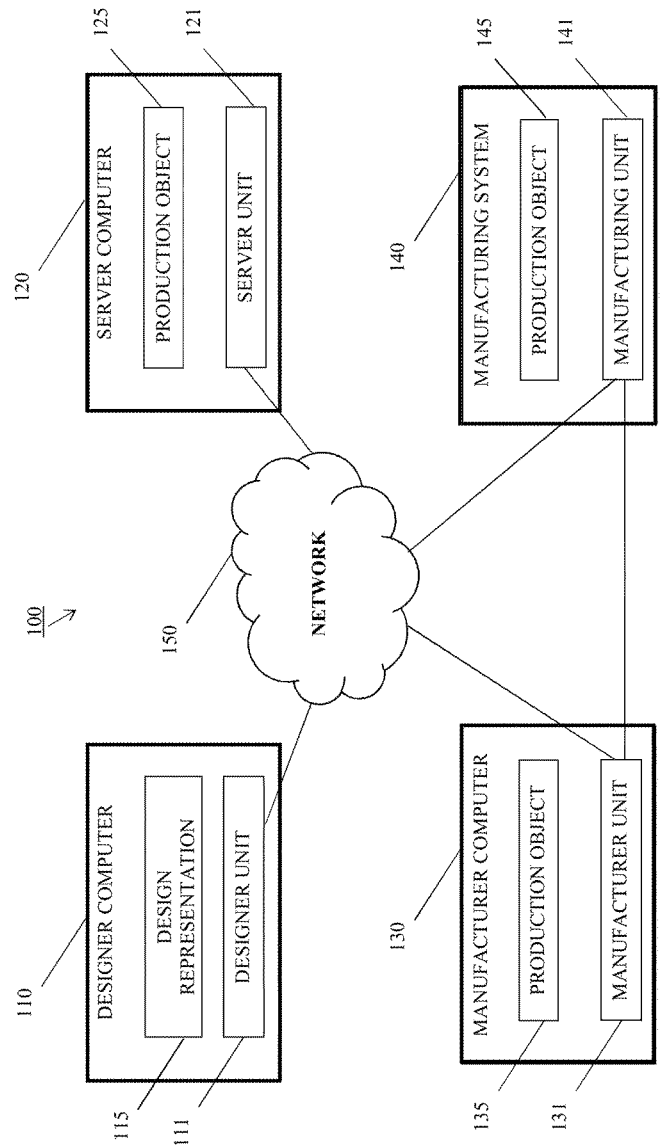
FIG. 1 shows an exemplary system according to embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Although embodiments of the invention are not limited in this regard, the term "set" when used herein may include one or more items.

Embodiments of the invention enable a designer to offer a design for sale and control the number of items that will be made based on the design. Embodiments of the invention enable a designer to control aspects such as which material will be used in producing an item based on their design, what type of system may be used etc. Embodiments of the invention enable a designer to control modifications that can be made to a design prior to using it for manufacturing an item Reference is made to FIG. 1 that shows an exemplary system 100 according to embodiments of the invention. As shown, system 100 may include, or be connected to, a designer computer 110, a server computer 120, a manufacturer computer 130 and a manufacturing system 140. Designer computer 110, a server computer 120 and a manufacturer computer 130 may communicate over network 150. Network 150 may be any suitable network, e.g., the internet.

Designer computer 110 may be a home, personal or portable computer (PC) or it may be a computer in an organization. For example, designer computer 110 may include any components included in computing device 700 as described herein with reference to FIG. 7, e.g., a controller and a memory. Designer computer 110 may be used by a designer in order to produce or develop a representation of a design. For example, a user may use designer computer 110 to generate design representation 115. A design representation may be a digital representation of a product or item, usable for manufacturing the item. For example, using formats known in the art, a design representation may be a computer file that includes information usable by a 3D printer in order to make or produce an item.

For example, design representation 115 may be a file generated according to the STereoLithography (STL) format known in the art (also known as Standard Tessellation Language). Although STL is mainly referred to herein, other formats may be used without departing from the scope of the invention. Generally, a design representation may be generated according to any device independent format and may be further processed by a specific device in order to generate a specific format usable by the specific manufacturing or printing device. For example, a 3D printer may process an STL file to produce a gcode (also known as Gcode or G-Code) representation or file and use the gcode representation in order to manufacture or print an item. It will be understood that embodiments of the invention enable using any device independent format in order to generate a design representation (e.g., design representation 115).

Designer unit 111 may be any suitable unit that carries out methods or operations further described herein. For example, designer computer 110 may be, or may include, a controller similar to controller 705 and a memory similar to memory 720 that stores executable code similar to executable code 725 and designer unit 111 may be the controller, memory and code. In other embodiments, designer unit 111 may be, or may include, hardware, software, firmware or any combination thereof. For example, designer unit 111 may be a card or chip installed in designer computer 110. As shown, designer unit 111 may communicate with server unit 121 and with manufacturer unit 131 over network 150.

Server computer 120 may be any suitable server or computing device. For example, server computer 120 may include any components included in computing device 700, e.g., a controller and a memory. Server computer 120 may provide services as further described herein. As shown, server computer 120 may include a server unit 121. Server unit 121 may be any suitable unit that carries out methods or operations further described herein. For example, server unit 121 may be, or may include, a controller similar to controller 705 and a memory similar to memory 720 that stores executable code similar to executable code 725 and server unit 121 may be the combination of the controller, memory and code. In other embodiments, server unit 121 may be, or may include, hardware, software, firmware or any combination thereof. For example, server unit 121 may be a card or chip installed in server computer 120. As shown, server unit 121 may communicate with designer unit 111 and with manufacturer unit 131 over network 150.

As shown, server computer 120 may generate and store a production object 125. Although only one production objects 125 is shown it will be understood that any number of similar objects may be generated, stored, sent and received by server computer 120, manufacturer computer 130, manufacturing system 140 and/or designer computer 110. Production object 125 may include a design representation (e.g., one similar to design representation 115). Production object 125 may include an encrypted version of a design representation, for example, design representation 115 may be encrypted by server unit 121 to produce an encrypted design representation and the encrypted design representation may be included in production object 125. For example, production object 125 may be a file that includes an encrypted design representation. Production object 125 may include metadata related to a design representation. For example, a production object (e.g., any one of production objects 125, 135 and 145 described herein) may include tokens, decryption keys, requested modifications and/or permitted modifications as further described herein. For example, requested modifications and/or permitted modifications may include parameters related to a scale, color, texture or other common Computer-aided design (CAD) model attributes as known in the art.

As described herein, a production object or messages related to manufacturing an item may include metadata. For example, capabilities or limitations related to a manufacturing device or limitations dictated by an owner or operator of a manufacturing device may by included in a production object or in messages related to manufacturing an item as described herein. For example, an owner or operator of a manufacturing device may indicate a desired or maximal size of the object to be made, a time constraint and the like.

Manufacturer computer 130 may be any suitable server or computing device. For example, manufacturing computer 130 may include any components included in computing device 700, e.g., a controller and a memory. As shown, manufacturer computer 130 may be operatively connected to manufacturing system 140. For example, manufacturer computer 130 may be directly connected to manufacturing system 140 using a universal serial bus (USB) wire or using wireless network or technology, e.g., WiFi as known in the art. As shown, manufacturing system 140 may be connected to network 150 and communicate with manufacturer computer 130, server computer 120 and/or designer computer 110 over network 150. Accordingly, it will be understood that manufacturing unit 141 may communicate with any other component of system 100 either via manufacturer unit 131 or directly through network 150.

As shown, manufacturer computer 130 may store a production object 135. For example, in response to a request to manufacture an item sent by manufacturer computer 130, server computer 120 may provide manufacturer computer 130 with production object 135 that may include a design representation usable by manufacturing system 140 in order to manufacture the item. Production object 135 (and production object 145 described herein) may include a decryption key for decrypting an encrypted design, tokens usable for determining the number of items that can be produced and various attributes of the produced items, e.g., color, material and/or modifications that can be applied to an original design.

As shown, manufacturing computer 130 may include a manufacturer unit 131. Manufacturer computer 130 may be any suitable unit that carries out methods or operations further described herein. For example, manufacturer computer 130 may be, or may include, a controller similar to controller 705 and a memory similar to memory 720 that stores executable code similar to executable code 725 and manufacturer unit 131 may be the combination of the controller, memory and code. In other embodiments, manufacturer unit 131 may be, or may include, hardware, software, firmware or any combination thereof. For example, manufacturer unit 131 may be a card or chip installed in manufacturer computer 130. As shown, manufacturer computer 130 may communicate with server unit 121 and with designer unit 111 over network 150.

Manufacturing system or device 140 may be any suitable system or device usable for manufacturing, printing, producing or making items or objects based on a digital design representation, e.g., based on design representation 115. Although printing or making items using a 3D printer is mainly referred to herein it will be understood that embodiments of the invention may be applicable to manufacturing, printing, producing or making items using any suitable device or system. Accordingly, the terms "manufacturing an item", "printing an item", "producing an item" and "making an item" may be used herein interchangeably. For example, manufacturing system 140 may be a home 3D printer used by a private individual, it may be a CNC machine operated by an organization or a production plant or any other computer-aided manufacturing system. It will be understood that the scope of the invention is not limited by the type of manufacturing system 140. As shown, manufacturing system 140 may receive and store a production object 145 that may include any data as described with reference to production object 135 as well as additional data or parameters. It will be noted that production object 125 may be, or may include elements or data different from production object 135 and/or production object 145. For example, production object 125 may include an encrypted version of design representation 115 and tokens, production object 135 may include an encrypted version of design representation 115 and a decryption key and production object 145 may include a decrypted version of design representation 115, e.g., the original design representation 115 as generated by a user on designer computer 110. In other scenarios, production object 145 may include a decrypted modified version of design representation 115, e.g., the result of applying modifications to the original design representation 115.

Figure 2:
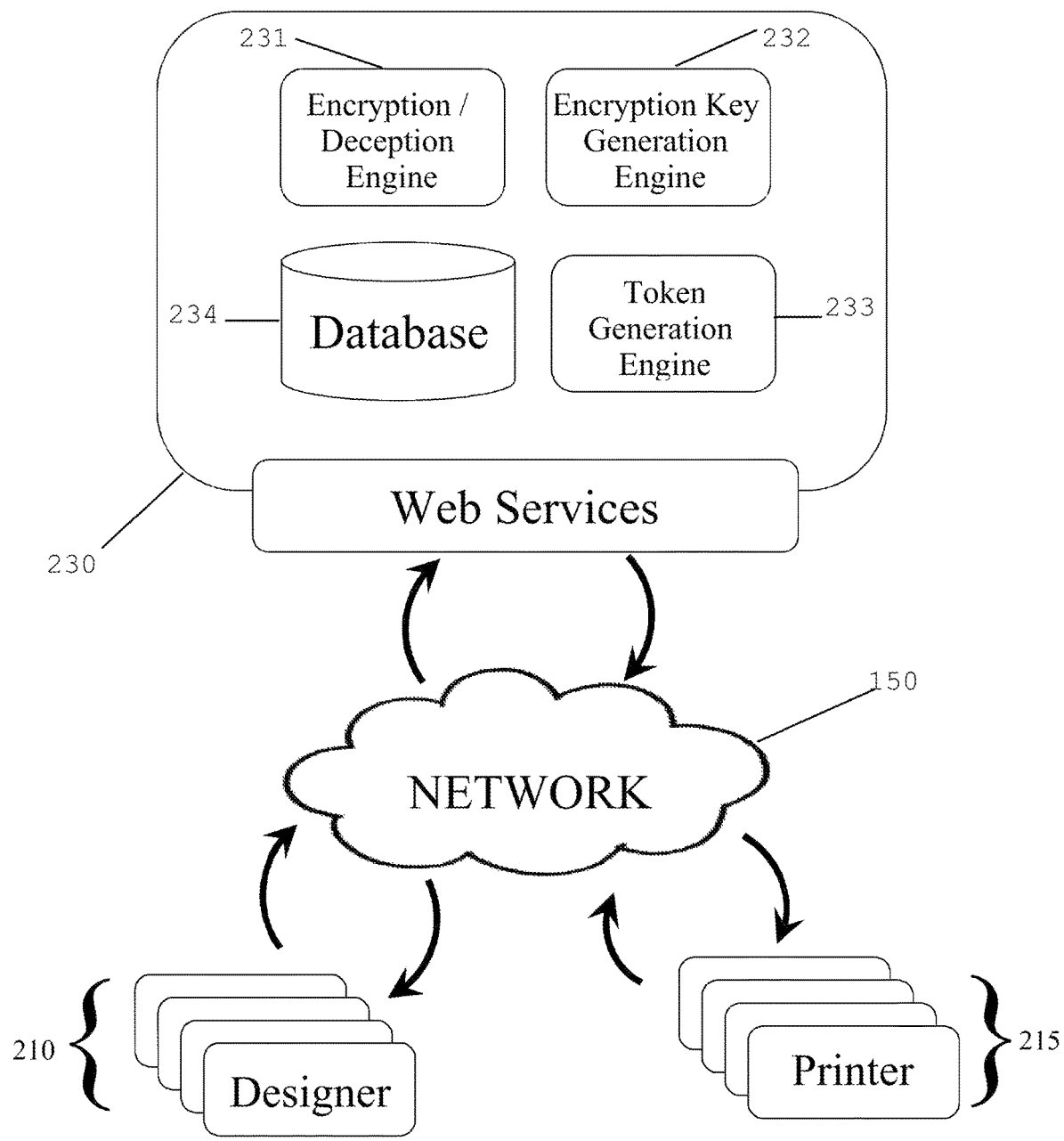
FIG. 2 shows an exemplary system according to embodiments of the invention.

System 100 may enable controlling manufacturing of an item using web services. Reference is made to FIG. 2 that shows an exemplary system according to embodiments of the invention. As shown, designer computing devices 210 and 3D manufacturing units (e.g printers 215) may interact with web services 230 over network 150. For example, designer devices 210 may be a plurality of designer computers 110 and printers 215 may be a plurality of manufacturing systems 140. Web services 230 may be provided by one or more server computers 120. For example, server unit 121 may include an encryption/decryption engine or unit 231, a key generation engine or unit 232 and a token generation engine or unit 233. As referred to herein (and as known in the art), an encryption key may be used for both encrypting and decrypting information, the terms "encryption key" and "decryption key" may be used herein interchangeably. Server computer 120 may include a database 234 or other storage system and server unit 121 may store in database 234 any information, e.g., tokens, decryption keys, tables used for token management, production objects etc. As further described herein, using web service 230, a designer may sell, distribute or provide designs he or she produces and clients, customers or users may use web services 230 in order to purchase and/or obtain the designs and manufacture or make items according to the designs, e.g., using 3D printers 215.

Alternatively or additionally, a 3$^{rd}$ party may use web service 230 to sell, distribute or provide designs, e.g., on behalf of a designer. Accordingly, embodiments of the invention may support a sale process while the actual sale may be done using any additional system or method, e.g., a system external to system 100.

Although web services are mainly referred to herein, other configurations are enabled by embodiments of the invention. For example, the engines and database shown included in web services 230 may be included in a server in an organization or even in a user or home computer. For example, a local server in an organization or designer computer 110 may carry out any operations described herein with reference to web services 230 and/or server 120.

Although messages exchanged over a network are mainly referred to herein, where applicable, other means for transferring data between components of system 100 may be used. For example, files containing digital design representations or any other data may be stored on a removable device (e.g. a USB device) and the removable device may be used in order to transfer data between components of a system. For example, a manufacturing device may be a simple 3D printer that is not connected to a network and a digital design representation (e.g., in a file) may be provided to the 3D printer using a USB stick or Secure Digital (SD) memory card or chip.

As referred to herein, a digital design representation (or design for short) may be or may include a set of instructions, values and parameters usable (e.g., by a 3D printer) for the construction, production or making of an object or a system. For example, design 115 may be generated by a designer using CAD software as known in the art. As described, a digital design representation may be generated according to any suitable format, e.g., a device independent format. As described, a manufacturing device may be adapted to transform or convert a digital design representation from one format or another. For example, manufacturing unit 141 and/or manufacturer unit 131 may transform a generic digital design representation included in an STL to a device specific digital design representation, e.g., generate a digital design representation using gcode, as is known in the art.

Although STL is mainly referred to herein, it will be understood that embodiments of the invention are not limited by the format according to which a digital representation of a design is generated, encrypted or communicated. For example, a digital representation of a design (that may be included in an STL file) may be based on American Standard Code for Information Interchange (ASCII), binary representations or both. Other 3D file formats may be used, e.g., OBJ and/or 3DM as known in the art. Files or containers other than an STL may be used. It will be understood for the sake of clarity and simplicity, STL is mainly referred to herein and that any format and encryption scheme may be used to generate and/or encrypt a design according to embodiments of the invention and any container or file that includes a design may be used.

Figure 3:
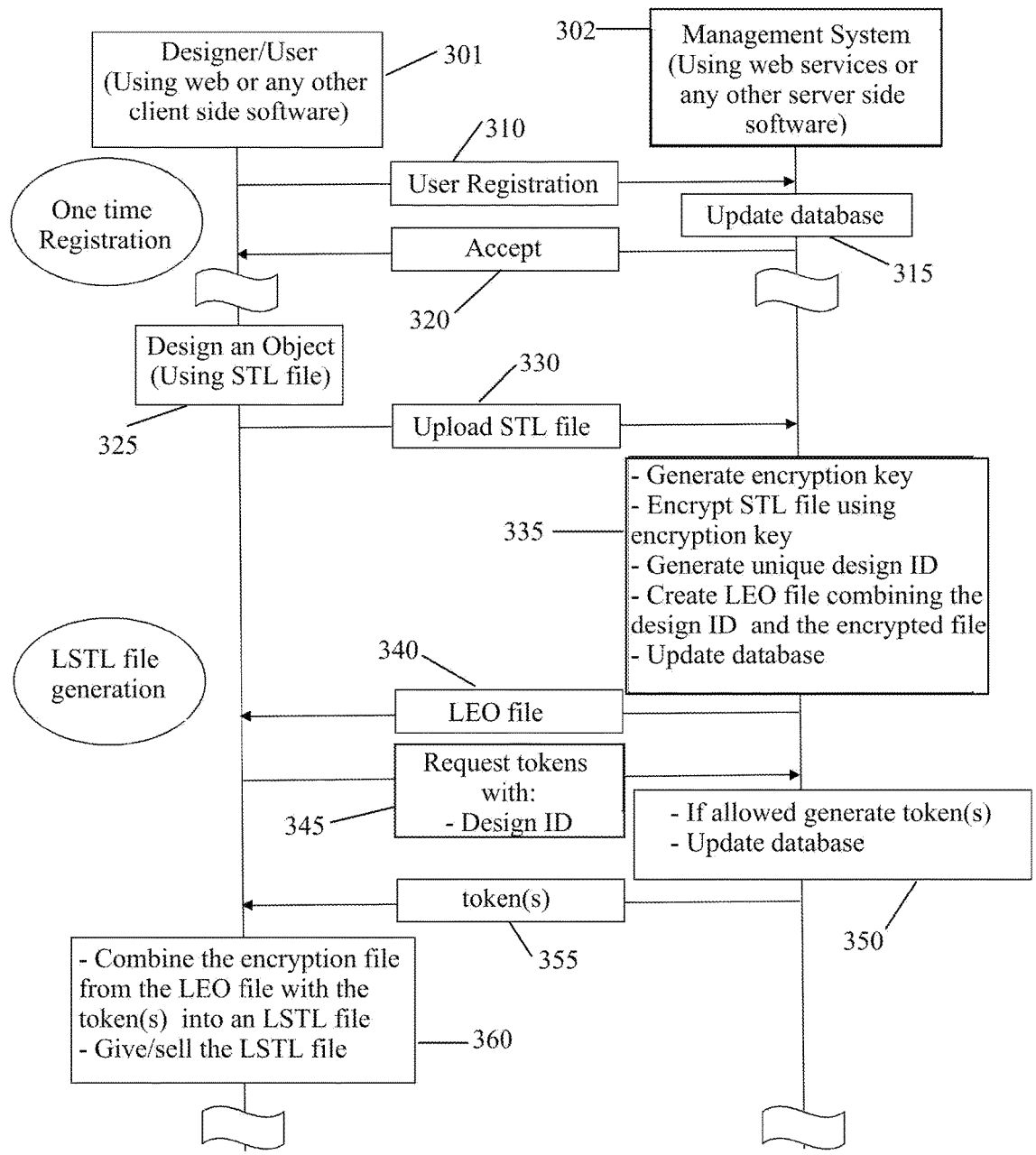
FIG. 3 is a flowchart diagram of a method according to some embodiments of the present invention.

Reference is made to FIG. 3, which illustrates a flowchart diagram of a method according to some embodiments of the present invention. Typically but not necessarily, the method or flow shown in FIG. 3 and described herein involves a designer or user as shown by block 301 and a management system or web service as shown by block 302. Generally, the term web service as referred to herein relates to a computer software function or service provided over a network, e.g., at a network address over the internet.

For example, in some embodiments, a management system as shown by block 302 is server unit 121, the designer as shown by block 301 is a user of user computer 110 and the user as shown by block 302 is a user of manufacturing computer 130.

Generally, a user as shown by block 301 may be any one of a designer, an operator of a marketplace, a buyer who pays for using a design and/or an owner of a manufacturing device. Of course, a designer may also be an owner of a manufacturing device. For example, a designer who uses designer computer 110 may also own and/or use manufacturing system 140. Similarly, a buyer may own or use manufacturing system 140. For example, in one scenario, designer unit 111 may generate and send messages as shown by blocks 310 and 330 and receive a message as shown by block 320, a computer operated by a provider of a marketplace may send and receive messages as shown by blocks 340 and 345 and 355 and a buyer may receive an LSTL file generated as shown by block 360. It will be understood that the roles assumed by entities such as a designer, a buyer and a marketplace are exemplary ones and other entities or roles may be contemplated without departing from the scope of the invention.

As shown by block 310, a flow may include user registration. For example, a designer that whishes to sell his designs over the internet may register or create an account in server 120, e.g., using web services 230 that may be provided by server 120. As shown by block 315, a database may be updated such the designer is recognized by a system in subsequent operations and events. For example, database 234 may be updated to include any information related to the designer as described herein, e.g., a unique designer identification (ID). As shown by block 320, an accept or acknowledge message may be sent back to the designer confirming the registration. For example, server unit 121 may inform designer unit 111 that a registration was successful and provide designer unit 111 with a designer ID. Designer unit 111 may include the designer ID in subsequent communications with any unit in system 100. Accordingly, a designer ID may be available to any unit in system 100.

As shown by block 325, a designer may generate a design of an object. For example, a designer may design a cup, a hat or any other object using a CAD application. The design (or digital representation of the design) may be generated, e.g., by the CAD application, according to any format, for example, the STL format may be used. AS shown by block 330, the design may be uploaded. For example, designer unit 111 may upload design 115 to server computer 120.

As shown by block 335, the uploaded design may be processed, metadata or other data may be generated and a production object may be generated. For example and as shown, a unique design identification (ID) may be generated for the design. A unique design ID may unambiguously identify, or point to, one and only one specific design. A unique design ID may identify, or reference one or more parts of a design. For example, a design ID may identify or reference a number of parts related to a multi part object where each part of the multi part object may be manufactured separately. For example, a design may include a cup and saucer that may be manufactured separately and a unique design ID may reference both the cup and saucer.

As shown, an encryption key may be generated. For example, a unique encryption key may be generated for each design. As shown, the encryption key may be used to encrypt the uploaded design to produce an encrypted digital representation of the design (referred to herein as "encrypted design"). Any system or method may be used to encrypt or otherwise encode an original (e.g., uploaded) digital representation of a design such that the encryption key is required in order to produce or reproduce the original digital representation of the design from an encrypted digital representation of the design. For example, an encryption key may be a randomly generated number with 256, 512, 1024 or more bits. Any algorithm, system or method may be used to generate an encryption key and/or generate an encrypted design as described herein. For example, known in the art methods such as Rivest-Shamir-Adleman (RSA), Data Encryption Standard (DES) or Advanced Encryption Standard (AES) may be used.

As shown by block 335, a production object may be generated. For example, a production object may be, or may include, a limited edition object (LEO) file. A LEO file may include the design ID and the encrypted design. As further shown, a database may be updated, e.g., the encrypted design, encryption key, design ID and designer ID may be stored. Tables or lists may be updated in a database such that using a design ID, or designer ID any relevant data (e.g., the encrypted or original designs) may be found. Accordingly, it will be understood that any relevant information may be readily available to any component of system 100. For example, provided with a designer ID, any unit in system 100 may readily find all designs produced by the designer, a design ID may be used in order to obtain the digital representation of the design and so on.

In an embodiment, a server may store metadata related to a design but the actual digital design representation may not be stored on the server. For example, server unit 121 may store in database any information related to a design, e.g., design ID, designer restrictions or other metadata related to a design as described herein and may further store a reference or pointer to the actual digital design representation. For example, an internet protocol (IP) address of a computer that stores the actual digital design representation may be stored such that server unit 121 may enable obtaining the actual digital design representation. For example, the digital design representation (e.g., as generated by a designer and/or in encrypted format) may be stored on designer computer 110 and provided to buyers or to a market place from designer computer 110.

As shown by block 340, a production object, for example, a LEO file as shown, may be provided. Server unit 121 may provide a LEO file to any unit in system 100. For example, manufacturer unit 131 may receive a LEO file from server unit 120 and use the LEO file in order to manufacture an item or object based on the design in the LEO file. Since the design included in the LEO file is encrypted, a further operation or step may be required in order to use the LEO file.

A LEO file may be used, e.g., in a web site, in order to sell designs. For example, a LEO file may include an image of an object or item, e.g., provided by a designer. An internet site (web site) may receive from server computer 120 a plurality of LEO files, extract images of designs from the LEO files and present images. Design IDs may be extracted from the LEO files and may be shown for each design image. The design IDs may be accessible to, or obtained by, users who visit the web site.

A system and method according to embodiments of the invention combine the use of encryption keys and tokens in order to control and/or manage manufacturing of an item. As shown by block 345, a method or flow may include a request for a token. A request for a token may include a design ID. For example, designer unit 111 (or a computer supporting a marketplace) may extract a design ID from production objects 125 and include it in a request for a token sent to server unit 121.

As shown by block 350, a method or flow may include determining whether or not to provide a token. For example, a designer may instruct a web site to only enable 10 items to be manufactured based on a specific design. A web site may limit the number of items made by setting a threshold for providing tokens (e.g., 10 in the above example). For example, upon receiving a request for a token as shown by block 345, server unit 121 may use the included design ID to examine a table in database 234 and determine whether or not to provide a token. If it is determined to provide a token then a token may be provided as shown by block 355. A message that includes a token as shown by block 355 may include a token or other metadata. If it is determined not to provide a token then various actions may be performed. For example, server unit 121 may alert a management unit that requests for unavailable items were received; a message may be presented or sent to a client or customer who was denied a token, etc.

The number of tokens provided as shown by block 355 may vary. For example, a request for tokens as shown by block 345 may be for seven ("7") tokens, but a threshold of five ("5") tokens may be set for the relevant design ID. In such case, sever unit 121 may only return five ("5") tokens. As further described herein, a unit may send a request to be informed how many tokens are available for an indicated design (e.g., indicated using the design's ID) and a server may respond to the request by providing the number of available tokens.

As shown by block 350, a database may be updated. For example, if it is indicated in the database that a limited number of tokens are to be provided to enable production or sell of a design then the number may be decreased by the number of tokens provided as shown by block 355. It will be understood that any number of tokens may be requested as shown by block 345 and any number of tokens may be provided as shown by block 355. Any calculation or algorithm may be used in determining whether or not to provide tokens as shown by block 350.

For example, server unit 121 may determine whether or not to provide tokens based on restrictions or criteria dictated or provided by a designer. For example, a designer may indicate a total or maximum allowed number of copies or objects that may be made based on a design and server unit 121 may only provide tokens if the number of copies already made based on the design is below the indicated number. Any other rules, restrictions, limitations or criteria may be used in determining whether or not to provide a token. For example, a rule or restriction may limit the number of objects that may be manufactured by a single user or buyer, or a threshold may limit the number of objects produced in a specific geographical area or country and so on.

As shown by block 360, an encrypted design (e.g., extracted from the LEO file provided as shown in block 340) and one or more tokens (e.g., received as shown by block 355) may be included in a production object also referred to herein as a LEO STL, or LSTL. The LSTL file may be sold or provided and used, e.g., as further described herein.

As described, an LSTL file may be stored on a server, e.g., in database 234 on server 120. In other embodiments, a server may store metadata related to a design and an LSTL file containing an encrypted digital representation of the design may be stored elsewhere, e.g., on a computer owned or operated by a designer, e.g., on designer computer 110.

Figure 4:
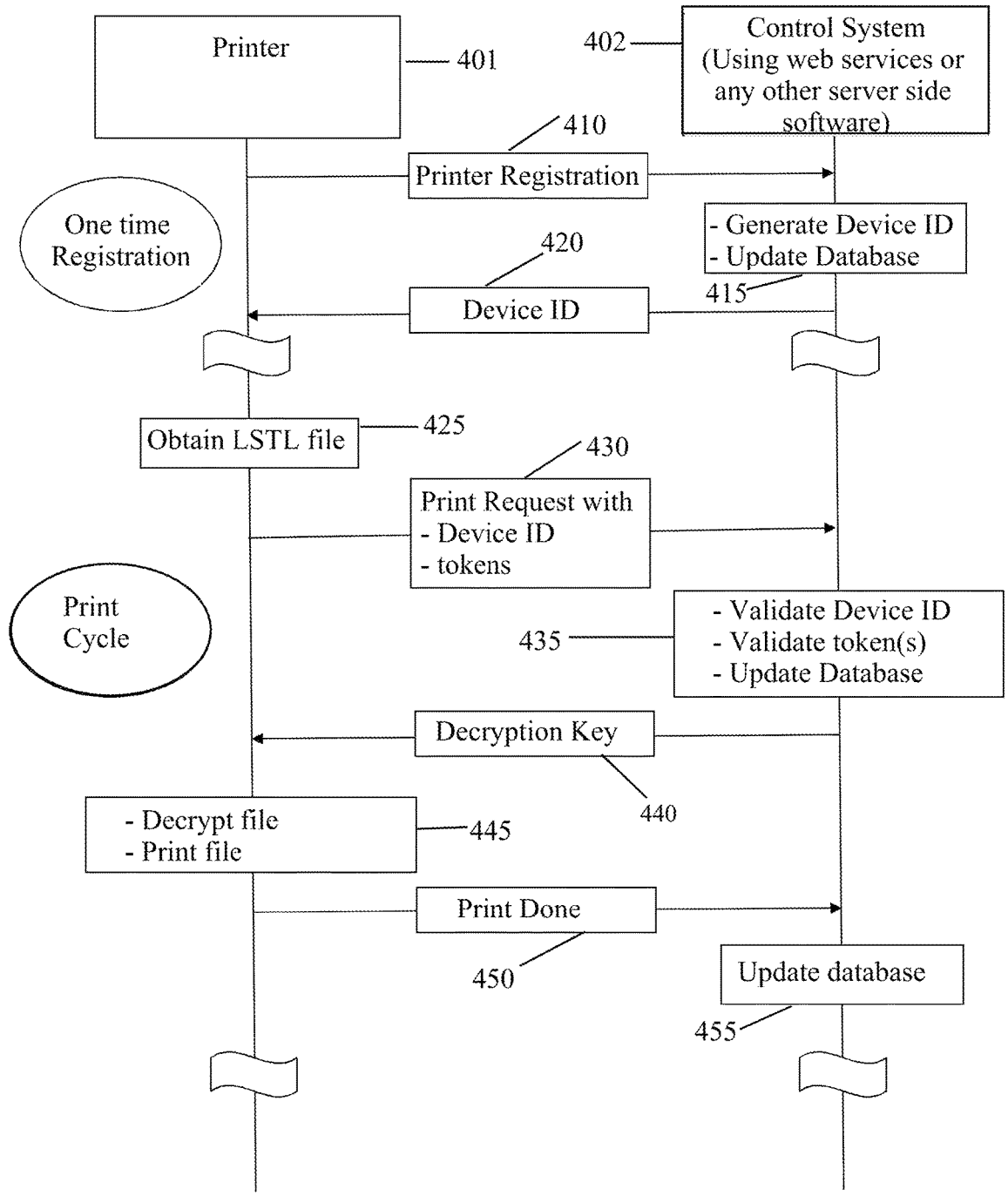
FIG. 4 is a flowchart diagram of a method according to some embodiments of the present invention.

Reference is made to FIG. 4, a flowchart diagram of a method according to some embodiments of the present invention. Typically but not necessarily, the method or flow shown in FIG. 4 and described herein involves a printer as shown by block 401 that may be manufacturing system 140 including manufacturing unit 141. A printer as shown by block 401 may be a system that includes both manufacturing computer 130 and manufacturing system 140. The method or flow shown in FIG. 4 and described herein may involve a management system as shown by block 402 that may be server unit 121.

As shown by block 410, the flow may include a registration of a printer. For example, manufacturing unit 141 sends a request to server unit 121. A request to register may include any data information or metadata. For example, in a request to register as shown by block 410, manufacturing unit 141 may include or indicate any attributes, description or properties of manufacturing system 140. For example, metadata provided by manufacturing unit 141 may include a model number or commercial name, a type etc. Metadata provided by manufacturing unit 141 may include a list of the materials that manufacturing unit 141 can use to manufacture items (e.g., plastic and copper), colors manufacturing unit 141 can use, etc. Other information in metadata provided by a manufacturing system may include restrictions or limitations, e.g., a minimal/maximal size of items that can be manufactured, a time period during which the manufacturing system can manufacture items etc.

Either in a message sent as shown by block 410 or in a separate message (not shown), characteristics or attributes of a manufacturing device may be provided. For example, capabilities or limitations of manufacturing system 140, e.g., supported scaling factors or object sizes, supported colors, or other common Computer-aided design (CAD) model attributes as known in the art may be provided to server unit 121 during a registration process.

User restrictions or limitations may be included in a device registration message or process. For example, even though a manufacturing device is capable of manufacturing objects in blue, green and red, an owner of the manufacturing device may want the manufacturing device to only manufacture green objects. In such case, user restrictions or limitations (e.g., included in a message sent as shown by block 410) may indicate that only green objects can be manufactured by the relevant device. As further described herein, controlling the manufacturing of an item may include determining whether or not to provide a token or decryption key based on user restrictions or constraints, characteristics or attributes of a manufacturing device and characteristics or limitations provided by a designer. For example, manufacturing of an item may be enabled if user and manufacturing device restrictions or constraints do not conflict with limitations or constraints indicated by a designer of the item.

As shown by block 415, the flow may include generating a device ID. For example, a unique ID may be generated as known in the art such a given device ID is associated with a single manufacturing device. A database may be updated. For example, server unit 121 may store the generated device ID and any relevant metadata, e.g., metadata received from manufacturing unit 141 as shown by block 410. Accordingly, using a unique device ID associated with a manufacturing device, attributes or any other metadata related to the manufacturing device may be obtained. For example, server unit 121 may store metadata of a device in database 234 and the information may then be extracted from database 234.

As shown by block 420, the flow may include providing a device ID. For example, server unit 121 sends a device ID to manufacturing unit 141 or to manufacturer unit 131.

As shown by block 425, the flow may include obtaining a production object. For example, the LSTL file produced as shown by block 360 in FIG. 3 may be provided by server unit 121 to manufacturing unit 141 or to manufacturer unit 131.

As shown by block 430, the flow may include requesting to manufacture an item. For example, a request sent as shown by block 430 may be a request to print in the case where manufacturing system 140 is a 3D printer. As shown, a request to manufacture or make an item may include one or more tokens and a device ID. A request to manufacture, make or print may include any metadata. For example, requested modifications to an original design of an item may be included in a request to manufacture an item. For example, provided with an LSTL file, manufacturing unit 141 may extract one or more tokens from the LSTL file and include the tokens and its device ID (e.g., provided as shown by block 420) in a request to manufacture or print an item based on a design in the LSTL file.

As shown by block 435, the flow may include validating the device ID, validating received tokens and/or updating a database. For example, server unit 121 may receive a device ID, tokens and metadata from manufacturing unit 141 and may determine whether or not to provide a decryption key based on the received device ID, received tokens and received metadata. For example, as described herein, the number of items manufactured based on a design may be controlled based on tokens provided and a threshold. Accordingly, a decryption key may only be provided if the number of items already made does not exceed a threshold. A decryption key may only be provided if the tokens received are validated. For example, server unit 121 may record in database 234 the tokens provided for a specific design and, when tokens are received with a request to manufacture an item as shown by block 430, server unit may validate the received tokens were indeed provided for the requested item design.

A system and/or method according to embodiments of the invention may enable manufacturing of an item based on a token as described herein. Although enabling a user or device to manufacture an item by providing a decryption key is mainly discussed herein, other methods may be used by systems according to embodiments of the invention. For example, encrypting a design as shown by block 335 may include any transformation or processing of a design to produce a processed object and the processed object may be provided as shown by block 340. In order to enable manufacturing of an item, an executable code (e.g., an application) may be provided. For example, an application configured to produce an original design from a processed object may be provided, e.g., instead of providing a decryption key as shown by block 440. Accordingly, to enable manufacturing an item, a system or method according to embodiments of the invention may not necessarily use a decryption key. For example, instead of providing a decryption key, an application that produces a design representation usable by a manufacturing device for manufacturing the item from a processed object may be provided, e.g., by server unit 121.

In other embodiments, enabling to manufacture an item may include sending a message, e.g., a message that includes permission to manufacture or print. For example, production object 145 provided to manufacturing system 140 may include a design representation usable by manufacturing system 140 for manufacturing an item and manufacturing unit 141 may only cause manufacturing system 140 to manufacture the item if permission is received from server unit 121 or from manufacturer unit 131. For example, rather than enabling to manufacture an item by providing a decryption key as shown by block 440, a flow may include enabling to manufacture an item by sending a message informing a printer or manufacturing device that manufacturing an item is permitted.

Server unit 121 may examine attributes of the requesting (or target) manufacturing device and determine whether or not to provide a decryption key based on attributes, properties or other parameters related to the manufacturing device. For example, server unit 121 may examine properties, capabilities or attributes of a target manufacturing device (e.g., received as shown by block 410 and recorded or stored in database 234) and may determine, based on properties or attributes of the manufacturing device whether or not to provide a decryption key.

For example, a designer may specify a set of printer types or models that may print his or her design. Accordingly, if manufacturing system 140 is not a printer that is included in a set of printers defined by the designer, server unit may determine to prevent manufacturing system 140 from printing an item (e.g., by determining not to provide a decryption key).

If it is determined to provide a decryption key, the decryption key may be provided as shown by block 440. A message that includes a decryption (or encryption) key as shown by block 440 may include a design ID or other metadata. If it is determined not to provide a decryption (or encryption) key then various actions may be performed. For example, server unit 121 may alert a management unit that requests to print were denied or refused, a message may be presented or sent to a client or customer who was denied a decryption (or encryption) key etc.

As shown by block 445, the flow may include using a decryption key to decrypt a file. For example, using a decryption key provided as shown by block 440, manufacturing unit 141 may decrypt an encrypted design in an LSTL file to produce an original or decrypted design and print or manufacture an item using the original or decrypted design. In an embodiment, an encrypted design may be decrypted and a representation of the design that is different from the original representation may be produced. For example, manufacturing unit 141 may decrypt an encrypted LSTL file or object and generate a gcode or other representation of the design. Accordingly, a first 3D design representation may be encrypted to produce an encrypted 3D design representation, e.g., by server unit 121 and the encrypted 3D design may be decrypted to produce a second 3D design representation that is different from the first 3D design representation.

As shown by block 450, the flow may include reporting to a management system upon completion of manufacturing an item. For example, manufacturing unit 141 may send a message to server unit 121 informing that a print was successfully completed or informing failure to print an item.

As shown by block 455, the flow may include updating a database. For example, server unit 121 may update any data or fields in database 234, e.g., decrease the number of tokens for a design, perform and record billing operations etc.

As described herein, in some embodiments, designs may be saved on a server (or in the cloud as referred to in the art). For example, design representations may be saved on server computer 120 that may be a web server. In other embodiments, other means or locations for saving or storing designs may be used. For example, server unit 121 may be included in designer computer 110 such that designer computer 110 may perform any operations described herein with reference or respect to server computer 120 and thus, systems and methods described herein may not necessarily include a web server or cloud storage. For example, including server unit 121, production object 125 may be generated and provided by, designer computer 110.

Figure 5:
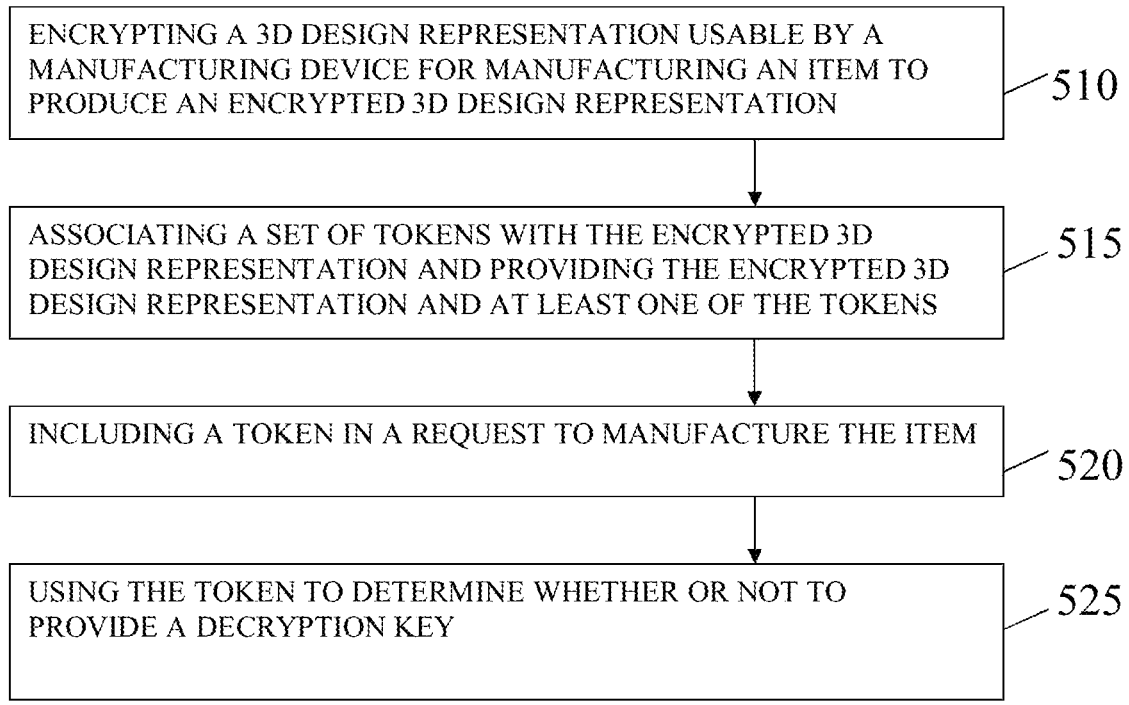
FIG. 5 is a flowchart diagram of a method according to some embodiments of the present invention.

Reference is made to FIG. 5, a flowchart diagram of a method according to some embodiments of the present invention. As shown by block 510, the method or flow may include encrypting a 3D design representation usable by a manufacturing device for manufacturing an item to produce an encrypted 3D design representation.

For example, the flow may include providing (e.g., by a designer as described herein) a first 3D design representation, the first 3D design representation usable by a manufacturing device for manufacturing the item. As described, server unit 121 may receive the first 3D design representation and encrypt it to produce an encrypted 3D design representation.

As shown by block 515, the method or flow may include associating a set of tokens with the encrypted 3D design representation and providing the encrypted 3D design representation and at least one of the tokens. For example, server unit 121 may generate tokens as shown by block 350 in FIG. 3 and associate the tokens with a design provided by a designer.

As shown by block 520, the method or flow may include including a token in a request to manufacture the item. Server unit 121 may provide the tokens, e.g., in response to a request for tokens as shown by blocks 345 and 355 in FIG. 3. Accordingly, a method may include obtaining a token (e.g., by a client from server unit 121) and including the token in a request to manufacture the item (e.g., a request as shown by block 430 in FIG. 4).

As shown by block 525, the method or flow may include using the token to determine whether or not to provide a decryption key. As described herein, if determining to provide the decryption key, the flow may include using the provided decryption key to decrypt the encrypted design to produce a second 3D design representation, the second 3D design representation usable by a manufacturing device for manufacturing the item. It will be noted that a first representation of a design may be used to produce an encrypted design and decrypting the encrypted design may produce a second, different from the first, decrypted representation of the design.

Various deviations or additions to the flow shown in FIG. 5 may be contemplated. For example, manufacturing unit 141 may use a decryption key and an encrypted design to produce a representation of the design that is usable by manufacturing system 140 (e.g., a representation in a specific machine code) where the representation of the design produced by manufacturing unit 141 is different from the representation of the design as provided by a designer who created the design. The flow may further include manufacturing the item, by a manufacturing system, based on a decrypted design representation.

As described, a set of tokens and an encrypted design representation may be provided in a container file. For example, a container file may be an LSTL or other production object as described herein. Obtaining a token (e.g., by a manufacturing unit) may include extracting the token from the container file. For example, tokens may be extracted from LSTL files by manufacturer unit 131 or by manufacturing unit 141.

Obtaining a token may include requesting a token. For example, as shown by block 345, a token may be obtained by requesting a token. Tokens may be generated in advance, e.g., when encrypting a design as shown by block 335 or they may be generated in real-time, e.g., upon receiving a request for a token. For example, token generation engine 233 may generate tokens in real-time, upon receiving a request for tokens. For example, server unit 121 may cause token generation engine 233 to generate a specified number of tokens for a specific design.

The flow may include receiving a request that includes a token and/or a design ID, using the token and/or a design ID to determine a number of items that may be manufactured based on the design and providing the number of items that may be manufactured. For example, a user may wish to manufacture three ("3") items based on a design. Prior to requesting to manufacture three ("3") items, a user may wish to know how many items (e.g., duplicates) may be produced. The user may (e.g., using manufacturer unit 131) send a request to server unit 121 and server unit 121 may respond with the number of items that may be made.

For example, based on tokens already served, based on instructions received from the designer or based on any other considerations (e.g., as described herein) server unit 121 may determine that only two ("2") items may be made by the requesting entity. Accordingly, in the above example, server unit 121 may inform, in a response that two ("2") items may be made. The user can then use the number indicated by server unit 121 in a subsequent request to print.

A request may include the number of items to be manufactured and a response may include permission to manufacture as requested or permission to manufacture an indicated number of items. For example, based on user input or otherwise, manufacturer unit 131 or manufacturing unit 141 may determine that five items are to be made based on a design. Manufacturer unit 131 or by manufacturing unit 141 may obtain a token as described and send a message to server unit 121 the message including the token, a design ID and a request to manufacture five items. Server unit 121 may use the token in order to determine a number of items that may be manufactured and may respond with a permission to manufacture as requested or the response may indicate a different, e.g., smaller number of items that may be made.

For example, as described, by tracking tokens provided and used, server unit 121 may record, track or monitor the number of items already manufactured based on a design and may limit or control the number of additional items that will be made.

As described, a flow may include associating a design identification or a design ID with a 3D design representation, e.g., as shown in block 335 in FIG. 3. The flow may further include providing the design ID, e.g., in a LEO file as shown by block 340. A flow may include including the design identification in a request for one or more tokens, e.g., as shown by block 345, generating a set of tokens in response to the request (e.g., as shown by block 350). A flow may include including a set of tokens and an encrypted file in a container file, e.g., as shown by block 360.

Figure 6:
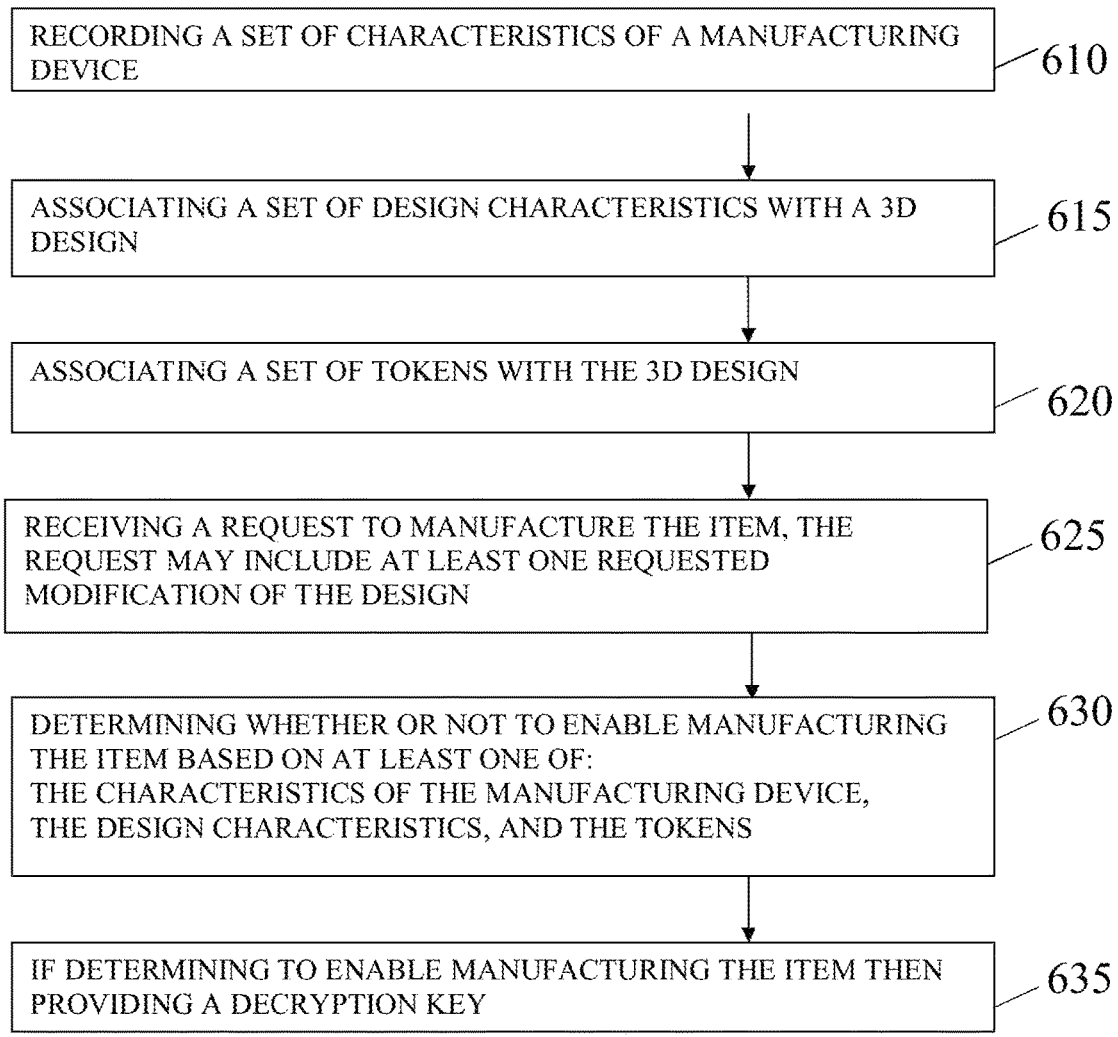
FIG. 6 is a flowchart diagram of a method according to some embodiments of the present invention.

Reference is made to FIG. 6, a flowchart diagram of a method according to some embodiments of the present invention. As shown by block 610, the method or flow may include recording a set of characteristics of a manufacturing device. For example, a set of characteristics of a manufacturing device may be provided by manufacturer unit 131 or by manufacturing unit 141 that may include the set of characteristics in a request to register as shown by block 410. The set of characteristics may be recorded in database 234, e.g., as shown by block 415.

As shown by block 615, the method or flow may include associating a set of design characteristics with a 3D design. For example, a set of design characteristics, restrictions, allowed modifications or other constraints may be provided by a designer when providing the design, e.g., as shown by block 330. The set of design characteristics may be stored in association with the design or with a design ID. Accordingly, a system and method according to embodiments of the invention may control manufacturing of an item based on a set of design characteristics. Generally, a designer may indicate attributes of items made according to his or her design by providing a set of design characteristics. For example, a set of allowed or permitted colors, a maximal or minimal size or scale, a set of materials to use may all be indicated in a set of design characteristics. As described, a request to manufacture an item according to a design may be processed according to characteristics associated with a design, e.g., characteristics provided by a designer. A request to manufacture an item according to a design may be allowed or denied based on examining requested attributes or modifications and restrictions or characteristics associated with the design. For example, if a designer indicates (e.g., when uploading a design as shown by block 330 in FIG. 3) that an item according to his design is to be manufactured in blue, a request to manufacture the item in red (e.g., as shown by block 430 in FIG. 4) may be denied.

As shown by block 620, the method or flow may include associating a set of tokens with the 3D design. For example, tokens generated as shown by block 350 may be associated with a design using the design ID provided as shown by block 345. For example, server unit 121 may store tokens in database 234 such that they are associated with a specific design ID, e.g., as known in the art.

As shown by block 625, the method or flow may include receiving a request to manufacture the item, the request may include at least one requested modification of the design. For example, prior to sending a request to print as shown by block 430, a user may use any CAD or other software tool to examine and modify the design. For example, the size, scale or material used may be changed by a user and the user may produce a set of desired or requested modifications. The user may then include the set of desired or requested modifications in a request to print, e.g., as shown by block 430.

As shown by block 630, the method or flow may include determining whether or not to enable manufacturing the item based on at least one of: the characteristics of the manufacturing device, the design characteristics, and one or more tokens. Generally, enabling manufacturing of the item may be or may include providing a decryption key that may be used to decrypt an encrypted design.

Determining whether or not to enable manufacturing the item based on token logic or considerations may be done as described herein. Determining whether or not to enable manufacturing the item based on the characteristics of the manufacturing device and the design characteristics may be done by relating or comparing the design characteristics to the characteristics of the manufacturing device. For example, if the design characteristics indicate that the item is to be manufactured using plastic and the characteristics of the manufacturing device indicate that the device can only use silicon then server unit 121 may determine not to enable manufacturing the item, e.g., in such case, server unit 121 may not return a decryption key as shown by block 440 and may further generate an alert, email etc.

Various other flows or sub-flows may be realized according to embodiments of the invention. For example, a request to manufacture an item including a set of requested modifications may be received as described and the requested modifications may be analyzed e.g., with respect to design characteristics or restrictions provided by a designer as described.

Even if not all requested modifications are permitted, a decryption key may still be provided. For example, server unit 121 may receive a request that includes three ("3") requested modifications, determine that only two of the requested modifications are permitted and return a decryption key and an indication of the two permitted modifications.

In another embodiment, server unit 121 may receive a request that includes a set of requested modifications, determine that only a sub-set of the set of requested modifications is permitted and return a response that lists or indicates the allowed or permitted sub-set of modifications. A user or unit may use the sub-set of allowed or permitted modifications in a subsequent request to print, e.g., as shown by block 430.

As shown by block 635, the method or flow may include, if determining to enable manufacturing the item, then providing a decryption key. For example, if token considerations or logic as described herein permits manufacturing of an item as requested and the set of requested modifications is permitted or authorized, e.g., by the designer, then server unit 121 may provide a decryption key as shown by block 440. Accordingly, a system or method according to embodiments may associate a set of design characteristics with a 3D design representation; receive a set of printer characteristics related to a printing device; and determine whether or not to provide a decryption key based on relating at least one of the set of design characteristics to at least one printer characteristic. A printing device may be any manufacturing device usable for manufacturing a 3D item or object based on a digital design or representation of the item or object.

Figure 7:
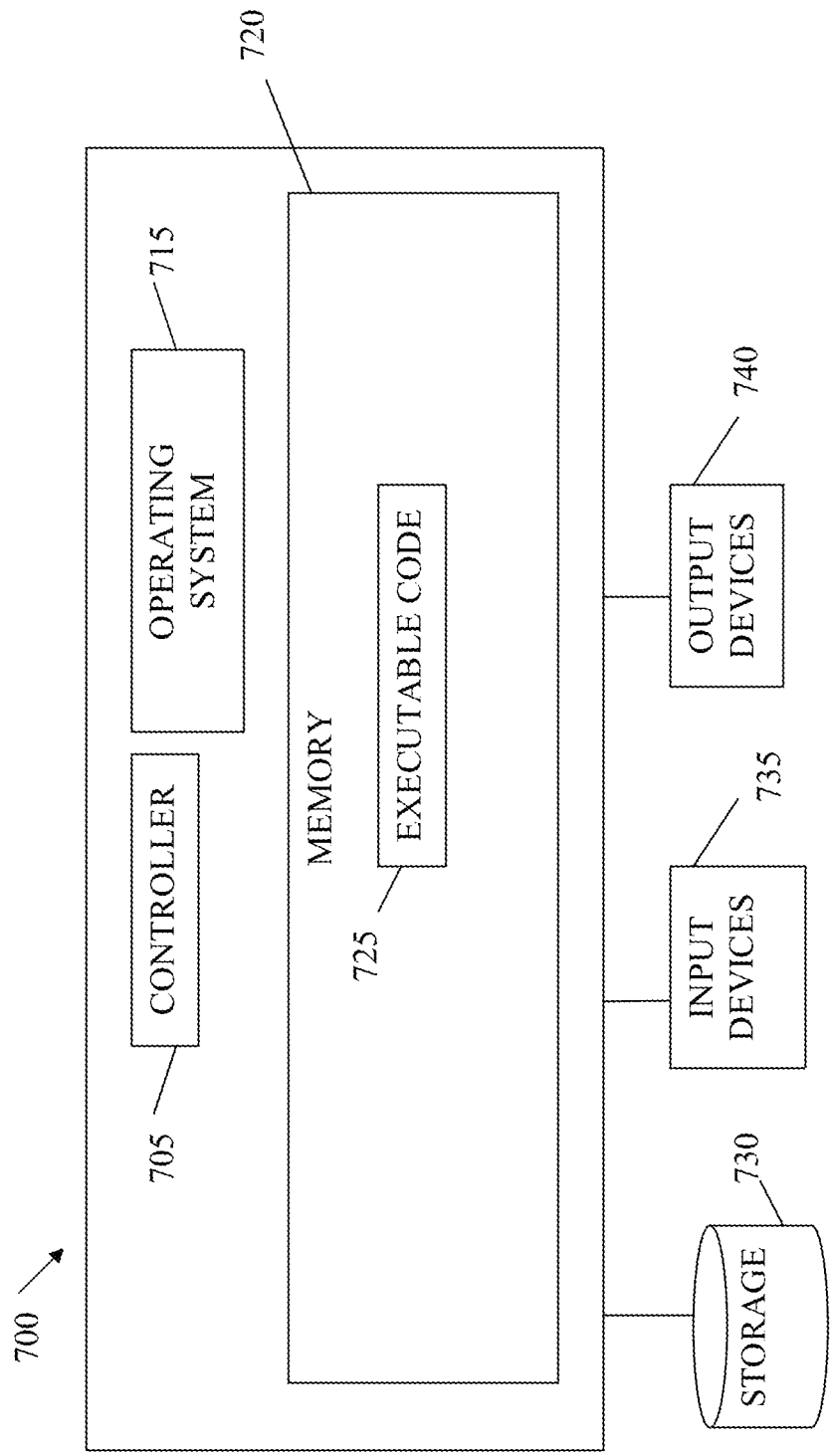
FIG. 7 shows a high level block diagram of an exemplary computing device according to embodiments of the present invention.

Reference is made to FIG. 7, showing high level block diagram of an exemplary computing device 700 according to embodiments of the present invention. As shown, computing device 700 may include a controller 705 that may be, for example, a central processing unit processor (CPU), a chip or any suitable computing or computational device, an operating system 715, a memory 720, a storage 730, an input devices 735 and an output devices 740. A system for manufacturing an item according to embodiments of the invention may comprise more than one computing devices 700.

Operating system 715 may be or may include any code segment designed and/or configured to perform tasks involving coordination, scheduling, arbitration, supervising, controlling or otherwise managing operation of computing device 700, for example, scheduling execution of programs. Operating system 715 may be a commercial operating system. For example, in an embodiment, operating system 715 is the Windows operating system provided by Microsoft.

Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a non-transitory memory or other suitable memory units or storage units. In an embodiment, Memory 720 is a non-transitory processor-readable storage medium that stores instructions and the instructions are executed by controller 705. In an embodiment, when the instructions stored in one or more memories 720 are executed by one or more controllers 705 they cause the one or more controllers 705 to carry out methods described herein. For example, server 120 may be a device similar to computing device 700 and server unit 121 may be a controller, memory and executable code as shown in FIG. 7 and described herein. Designer computer 110 and manufacturer computer 130 may be similar to, or may include components of computing device 700. Accordingly, designer unit 111 and/or manufacturer unit 131 may be or may include a controller, a memory and a set of instructions or executable code. Manufacturing system 140 may include any components included in computing device 700. Accordingly, manufacturing unit 141 may be or may include a controller, a memory and a set of instructions or executable code.

Executable code 725 may be any executable code, e.g., an application, a program, a process, task or script. Executable code 725 may be executed by controller 705 possibly under control of operating system 715. For example, executable code 725 may be an application that performs methods described herein. For example, a plurality of executable code segments similar to executable code 725, when executed by a plurality of controllers similar to controller 705 may cause the controllers to carry out methods as shown by FIGS. 3, 4, 5 and 6 and described herein.

Where applicable, executable code 725 may carry out operations described herein in real-time. One or more computing devices 700 and executable code 725 may be configured to update, process and/or act upon information at the same rate the information, or a relevant event, are received. For example, generating tokens as described herein may be done in real-time, e.g., immediately upon receiving a request as described. One or more controllers or processors 705 may be configured to carry out methods as disclosed herein, for example by being connected to one or more memories 720 storing executable code 725.

Storage 730 may be or may include, for example, a hard disk drive, a CD-Recordable (CD-R) drive, a universal serial bus (USB) device, an SD memory card or other suitable removable and/or fixed storage unit. For example, database 234 may include a storage system such as storage 730.

Input devices 735 may be or may include a mouse, a keyboard, a touch screen or pad or any suitable input device. Input devices 735 may include a network interface card (NIC) that enables computing device to communicate over a network, e.g., over network 150. For example, a NIC installed in computing device 700 may be used to send and receive messages as described with reference to FIGS. 3 and 4. Other input devices or components included in input devices 735 may be a touch screen or pad or components that enable voice control and/or interacting with computing device 700 using gestures, e.g., using a touch screen as known in the art. It will be recognized that any suitable number of input devices may be operatively connected to computing device 700 as shown by block 735. Output devices 740 may include one or more displays, speakers and/or any other suitable output devices. Output devices 740 may include a network interface card (NIC) that enables computing device to communicate over a network, e.g., over network 150. It will be recognized that any suitable number of output devices may be operatively connected to computing device 700 as shown by block 740. A unit or module as described herein may be or may include executable code 725 and controller 705. For example, methods described herein may be performed by computing device 700 and units adapted to control manufacturing of an item as described herein may be a units that include executable code 725 and controller 705.

Embodiments of the invention may include an article such as a computer or processor non-transitory readable medium, or a computer or processor non-transitory storage medium, such as for example memory 720, a disk drive, or a flash memory, encoding, including or storing instructions, e.g., computer-executable instructions, which, when executed by a processor or controller (e.g., controller 705), carry out methods disclosed herein. For example, storage medium such as memory 720, computer-executable instructions such as executable code 725 and a controller such as controller 705.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer or a server computer.

Unless explicitly stated, the method embodiments described herein are not constrained to a particular order or sequence. Additionally, some of the described method embodiments or elements thereof can occur or be performed at the same point in time. While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention. Various embodiments have been presented. Each of these embodiments may of course include features from other embodiments presented, and embodiments not specifically described may include various features described herein.

What is claimed is:

1. A method of controlling manufacturing of an item, the method comprising:
   providing a three dimensional (3D) design representation, the 3D design representation usable by a manufacturing device for manufacturing the item;
   encrypting the 3D design representation to produce an encrypted 3D design representation;
   associating a set of tokens with the encrypted 3D design representation and providing the encrypted 3D design representation and at least one token from the set of tokens;
   including, by the manufacturing device, a token in a request to manufacture the item and sending by the manufacturing device the request to manufacture the item to a server;
   determining whether or not to enable manufacturing of the item using, by the server, the token, and device characteristics of the manufacturing device related by the server to design characteristics of the 3D design representation;
   using, by the server, the token to determine permitted modifications to the design representation, and the number of items allowed to be manufactured;
   if determining to enable manufacturing of the item, providing a decryption key; and
   using the decryption key to produce the 3D design representation usable by the manufacturing device for manufacturing the item.

2. The method of claim 1, comprising the server obtaining the set of tokens and wherein at least some of the set of tokens are generated in real-time, upon receiving a request for a token.

3. The method of claim 1, wherein using the token to determine permitted modifications to the design representation comprises:
   receiving a request to manufacture the item, the request including a set of requested modifications;
   analyzing the set of requested modifications; and
   if determining at least one of the requested modifications is permitted, enabling manufacturing of the item.

4. The method of claim 1, wherein using the token to determine permitted modifications to the design comprises:
    receiving a request to manufacture the item, the request including a set of requested modifications;
    analyzing the set of requested modifications;
    determining at least one of the requested modifications is permitted; and
    providing a list of permitted modifications.

5. The method of claim 1, comprising: providing, in response to a request, the number of items allowed to be manufactured.

6. The method of claim 1, comprising:
    receiving a request to manufacture items, the request including the token and an indication of a number of items to be manufactured.

7. The method of claim 1, comprising:
    associating a design identification with the 3D design representation;
    including the design identification in a request for one or more tokens;
    generating a set of tokens in response to the request; and
    including the set of tokens in a container file.

8. A system for controlling manufacturing of an item, the system comprising:
    a first memory and a first controller, the first controller configured to:
    use an encryption key to encrypt a 3D design representation and to produce an encrypted 3D design representation;
    associate at least one token from a set of tokens with the encrypted 3D design representation and provide the encrypted 3D design representation and the at least one token;
    receive, from a manufacturing device, a token included in a request to manufacture the item;
    use the token, and device characteristics of the manufacturing device related to design characteristics of the 3D design representation, to determine whether or not to enable manufacturing of the item;
    use the token to determine permitted modifications to the design representation, and the number of items allowed to be manufactured; and
    if determining to enable manufacturing of the item, providing a decryption key, the decryption key usable to produce the 3D design representation usable by the manufacturing device for manufacturing the item.

9. The system of claim 8, wherein the first controller is configured to obtain the token and wherein at least some of the set of tokens are generated in real-time, upon receiving a request for a token.

10. The system of claim 8, wherein using the token to determine permitted modifications to the design representation comprises:
    receiving a request to manufacture the item, the request including a set of requested modifications;
    analyzing the set of requested modifications; and
    if determining at least one of the requested modifications is permitted, enabling manufacturing of the item.

11. The system of claim 8, wherein using the token to determine permitted modifications to the design representation comprises:
    receiving a request to manufacture the item, the request including a set of requested modifications;
    analyzing the set of requested modifications;
    determining at least one of the requested modifications is permitted; and
    providing a list of permitted modifications.

12. The system of claim 8, wherein the first controller is configured to:
    receive a request to manufacture items, the request including an indication of a number of items to be manufactured.

13. The system of claim 8, wherein the first controller is configured to:
    associate a design identification with the 3D design representation;
    receive the design identification in a request for one or more tokens;
    generate the set of tokens in response to the request; and
    include the set of tokens and an encrypted file in a container file.

14. The system of claim 8, wherein using the token and characteristics of the manufacturing device to determine whether or not to enable manufacturing of the item comprises the first controller receiving a set of characteristics related to the manufacturing device and determining whether or not to provide the decryption key based on the set of characteristics.

15. A method of controlling manufacturing of an item, the method comprising:
    using an encryption key to encrypt 3D design representation and to produce an encrypted 3D design representation;
    associating a set of design characteristics with the 3D design representation;
    associating a set of tokens with the encrypted 3D design representation and providing the encrypted 3D design representation and at least one token from the set of tokens;
    including by a manufacturing device a token from the set of tokens in a request to manufacture the item and sending by the manufacturing device the request to manufacture the item to a server;
    including a set of device characteristics related to the manufacturing device in the request;
    determining, by the server, whether or not to enable manufacturing of the item based on a token included in the request and based on relating at least one of the set of design characteristics to at least one of the device characteristics, and determining, by the server permitted modifications to the design based on the token; and
    if determining to enable manufacturing of the item, providing a decryption key.

* * * * *